United States Patent [19]

Langkamp

[11] Patent Number: 5,145,196
[45] Date of Patent: Sep. 8, 1992

[54] COLLAPSIBLE TRICYCLE

[76] Inventor: Dennis J. Langkamp, 8396 S. Chicago Rd., #106, Oak Creek, Wis. 53154

[21] Appl. No.: 679,328

[22] Filed: Apr. 2, 1991

[51] Int. Cl.$^5$ .............................................. B62K 15/00
[52] U.S. Cl. .................................... 280/278; 280/287
[58] Field of Search .................... 280/278, 287, 288.1, 280/42, 263, 267, 269, 236, 238

[56] References Cited

U.S. PATENT DOCUMENTS

| | | | |
|---|---|---|---|
| 2,956,443 | 10/1960 | Nelson | 280/236 X |
| 3,050,050 | 8/1962 | Kubicek | 280/42 X |
| 3,429,584 | 2/1969 | Hendricks | 280/261 |
| 3,561,778 | 2/1971 | LaBrie | 280/7.14 |
| 3,732,787 | 5/1973 | Yamaguchi | 280/236 X |
| 3,791,672 | 2/1974 | Pera | 280/287 |
| 3,834,721 | 9/1974 | Gobby | 280/236 X |
| 3,854,755 | 12/1974 | Tang | 280/278 |
| 3,910,599 | 10/1975 | Thomas | 280/236 X |
| 4,061,046 | 12/1977 | Lang | 280/236 X |
| 4,067,589 | 1/1978 | Hon | 280/278 |
| 4,077,640 | 3/1978 | Perego | 280/42 |
| 4,432,561 | 2/1984 | Feikema et al. | 280/281 |
| 4,460,190 | 7/1984 | Spiess | 280/269 X |
| 4,497,502 | 2/1985 | Forbes et al. | 280/281 LP |
| 4,548,421 | 10/1985 | Weiner | 280/281 LP |
| 4,621,826 | 11/1986 | Ziegler, Jr. | 280/259 |
| 4,767,130 | 8/1988 | Fu-Chao | 280/278 X |
| 4,889,354 | 12/1989 | Wen | 280/236 |
| 4,903,857 | 2/1990 | Klopfenstein | 280/269 X |

FOREIGN PATENT DOCUMENTS

141366  8/1949  Australia .

Primary Examiner—Robert P. Olszewski
Assistant Examiner—Dean A. Reichard
Attorney, Agent, or Firm—Jansson & Shupe, Ltd.

[57] ABSTRACT

The invention is an improvement on a tricycle of the type having a rear drive wheel and a pair of forward steering or guide wheels. The improved tricycle has a rigid frame extending along a central axis. Lateral supports extend from either side of the frame, each such support having a guide wheel mounted on the outer portion. A kingpin arrangement at each outer portion is for steering the front wheels. A linkage extends between the kingpins for maintaining the guide wheels parallel irrespective of steering angle. The lateral supports are retractable with respect to the frame so that the tricycle is collapsible. Such tricycle also includes an adjustable, detachable seat mounted relatively high above the ground so the rider's visibility is improved. Such seat is elevated with respect to the pedal sprocket so that while pedaling, the rider's knees do not interfere with vision.

19 Claims, 7 Drawing Sheets

COLLAPSIBLE TRICYCLE

FIELD OF THE INVENTION

This invention is generally related to small land vehicles and, more particularly, to rider-powered tricycles.

BACKGROUND OF THE INVENTION

Tricycles have been used for decades and provide a pleasant means of relaxing, recreational transportation. Historically, tricycles have been of the rigid-frame type and are included in the repertoire of toys for most smaller children. Most recently, larger and faster tricycles have been offered for use by adults. Many such tricycles are of the recumbent type in which the rider operates the cycle from a reclining or near-reclining position. One such recumbent tricycle, shown in U.S. Pat. No. 4,548,421 (Wiener), is called the landspeeder and includes a rear driving wheel, a pair of steerable front wheels and a rider's "couch" positioned between the front and rear wheels. The pedal sprocket is located forward and above the front wheels and multiple gear ratios are provided by a derailleur.

Yet another recumbent tricycle is known as the "BRIKE" and has a pair of inwardly-tipped rear wheels, a single front driving wheel and a recliner-type seat between the front and rear wheels. Like the landspeeder, the pedal sprocket is positioned forward and somewhat above the front drive wheel. The BRIKE has but a single drive gear ratio.

Still another type of recumbent cycle is known as the "corsa" which, like those mentioned above, has a reclining-type seat positioned between the front and rear wheels. The corsa cycle has a single rear wheel, two front wheels and side sticks which control steering, breaking and shifting for its 9-speed transmission. Pedals are mounted well forward and above the front wheels.

Yet another type of recumbent tricycle is shown in U.S. Pat. No. 4,497,502 (Forbes et al.). What is called a "knock-down" is shown in U.S. Pat. No. 4,621,826 (Ziegler Jr.). The tricycle shown in the Ziegler Jr., patent is clearly intended for use by small children. Yet another type of tricycle is shown in U.S. Pat. No. 3,561,778 (LaBrie) while folding or collapsible bicycles are shown in U.S. Pat. Nos. 3,791,672 (Pera); 3,854,755 (Tang) and 4,067,589 (Hohn).

One disadvantage is that such cycles are not collapsible. If one desires to transport such a cycle in a motor vehicle or the like, the cycle occupies an unnecessarily large amount of space.

The recumbent tricycles described above tend to share certain disadvantages. In particular, the rider must be in a reclining or near-reclining position to operate them. The resulting visibility is poor because the rider is positioned very near the ground and such poor visibility is aggravated by the fact that as the cycle is propelled by pedalling, the riders knees obstruct forward vision.

Yet another disadvantage is that when the rider is in a reclining or near-reclining position close to the ground, it is difficult to mount and dismount the cycle. Still another disadvantage arising from the need to accommodate a reclining rider is that the cycle is unnecessarily long and therefore more difficult to transport.

Still another disadvantage is that it is difficult if not impossible to carry an infant in a separate infant seat. The arrangement of known cycles simply does not accommodate the attachment of such a seat. This is likely dismaying to parents of small children. Still another disadvantage of known recumbent tricycles is that the seats are (or appear to be) neither adjustable nor removable. Adjustability is important for maximum comfort of riders having differing body lengths.

An improved tricycle which is collapsible which provides good visibility in traffic, which accommodates an infant seat and which provides a multi-speed drive arrangement would be an important advance in the art.

OBJECTS OF THE INVENTION

It is an object of this invention to overcome some of the problems and shortcomings of the prior art.

Another object is to provide an improved tricycle which is collapsible.

Still another object of the invention is to provide an improved tricycle wherein the rider is seated generally upright and has improved visibility.

Yet another object of the invention is to provide an improved tricycle having an overall length less than that of conventional recumbent tricycles.

Still another object of the invention is to provide an improved tricycle which accommodates an infant seat.

Yet another object of the invention is to provide an improved tricycle which is easy to mount and dismount.

These and other important objects will be apparent from the descriptions of this invention which follow.

SUMMARY OF THE INVENTION

The invention relates to Disclosure Document No. 253,895 filed on May 24, 1990. The inventive tricycle is of the type having a rear drive wheel and a pair of forward guide wheels for steering. The improvement includes a rigid frame made of tubing and extending along a central axis with the drive wheel mounted at the rear of the frame. Lateral support means extends from either side of the frame and has distal portions with a guide wheel mounted on each such portion. Steering is by means at each such distal portion for reorienting the guide wheel relative to such portion.

The tricycle also includes linkage means between the pair of reorienting means to maintain the guide wheels parallel to one another irrespective of steering orientation. Means are also included to retract the lateral support means with respect to the frame so that the tricycle is collapsible.

In a highly preferred embodiment, The lateral support means includes a support arm extending from each side of the frame and having an outward or distal portion and an inward or proximal portion. The retracting means includes a pivot joint permitting movement of such arm with respect to the frame so that the guide wheels may be drawn inward toward the frame to collapse the tricycle. Preferably, a pivot joint is located between the proximal and distal portions of each arm and a locking device coupled to each proximal portion for restraining the support arm from pivoting movement when the tricycle is in use.

The lateral support means also includes a mounting boss for each support arm. Each such boss is attached to and extends laterally a short distance from the frame. The pivot joint (such as a bolt extending through the support arm and the boss) is positioned near the outer end of the boss while the locking device (e.g., a removable pin extending through the proximal end of the arm and the boss) is adjacent the inner part of the boss near the frame. When the pin is in place, the arms are maintained in an extended position. The pin is removed to permit retraction of each arm by folding them inward toward the frame. In that way, the tricycle is given a wide "stance" for lateral stability when in use. However, when it is collapsed, the frame and lateral support means are reduced to a relatively narrow width.

The reorienting means includes a kingpin mounted for turning movement in a sleeve at the distal end of each support arm. An axle extends outward from the lower end of each kingpin and has a guide wheel mounted thereon for rotation. A torsion member is attached to the kingpin above the sleeve and the outer end of such member is attached to the linkage means as described below.

The reorienting means also includes a device grasped by the rider for steering the tricycle. Preferably such device is a tiller or is of the tiller type having a grasping handle. In a highly preferred embodiment, the reorienting means includes two tillers, one mounted for steering each guide wheel. Such tillers exhibit "contra-movement" during steering; that is, one tiller moves forward and the other moves rearward when making a turn. The rearward-moving tiller corresponds to the direction of the turn, i.e., left or right. Each tiller handle is attached to a handle extension and such extensions are formed to overlap one another when the tricycle is collapsed. This feature helps further reduce the collapsed width of the tricycle while yet maintaining such handles at substantially the same height when the tricycle is being ridden.

The linkage means, used for maintaining the guide wheels parallel while steering, includes an arm attached to the torsion member of the reorienting means by a coupling. Preferably, such coupling is of the "pin-and-slot" type permitting pivoting movement about the pin and movement of the pin along a slot formed in the arm. Such arm also has an inner or proximal end and the distance between the coupling and the proximal end is changed when collapsing the tricycle. The linkage means also includes a blocking mechanism which, when in the blocking position, maintains a minimum distance between the coupling and the proximal end when the tricycle is in use. When such blocking mechanism is positioned for collapsing the tricycle, the distance between the coupling and the proximal end of the arm is changed by reducing such distance.

The proximal end of each arm is attached to a synchronizing yoke so that the guide wheels are maintained parallel when the tricycle is in use and being steered. And such yoke assures the tillers move in unison (albeit in different directions) during steering. Preferably, such yoke is generally V-shaped and is pivotably pinned to the frame at its apex. The "legs" or extensions of the yoke diverge outward for pivotable connection to the arm. A steering "stop" is attached to the frame and an extension contacts such stop at each limit of steering angle.

A highly utilitarian feature of the improved tricycle is its chair-like seat which is adjustable fore and aft for riders of differing body dimensions. And the seat is removable from the frame so that when the tricycle is collapsed for transporting, it can fit into a smaller space.

Such seat has a seating surface and a generally upright back surface angled only slightly toward the rear drive wheel. The seating surface is mounted above an imaginary line extending between the axes of rotation of the front-mounted pedal sprocket and the rear drive wheel. When so mounted, the rider "sits high" on the tricycle and therefore has much better visibility in traffic.

The pedal sprocket is positioned at the front of the frame and generally below a plane extended horizontally from the seating surface. The relative locations of the sprocket, seating surface and slightly-angled back surface support the rider in what may be described as a "quasi-recumbent" position. As used herein, a "quasi-recumbent position" means a position where the rider's legs extend forward for pedaling but do not impair visibility. Such phrase also means a position where the rider's back is supported in an upright but slightly angled position rather than in a reclining or near reclining position. In other words, the rider does not have to lie down to use the improved tricycle—one can operate it while comfortably seated. And since there is no need to provide cycle structure accommodating the nearly-full length of a rider's body in a reclining position (as with a conventional recumbent tricycle), the improved tricycle has a reduced overall length.

Yet another aspect of the invention is that the back panel of the seat is of the curved or "wrap around" type. Such panel not only provides a more comfortable ride but such curvature imparts a high degree of rigidity. The back panel also folds downward.

A problem confronting designers of folding cycles generally is the matter of "cable management," i.e., handling and arranging the cables used for actuating brakes and gear shifting. The inventive tricycle neatly solves this dilemma by using a rear drive wheel of the shifting hub type having an integral pedal-operated brake mechanism. Devices such as derailleurs and external brakes (with their attendant complexity and multiplicity of operating cables) are eliminated. The tricycle is therefore more easily collapsed. In the improved tricycle, a lever is mounted on the seat and linked to the shifting hub by two small diameter flexible steel cables extending rearward near the frame. In that way, there is no need to reroute or unhook cables when collapsing or setting up the tricycle.

DETAILED DESCRIPTION OF PREFERRED EMBODIMENTS

Figure 1:
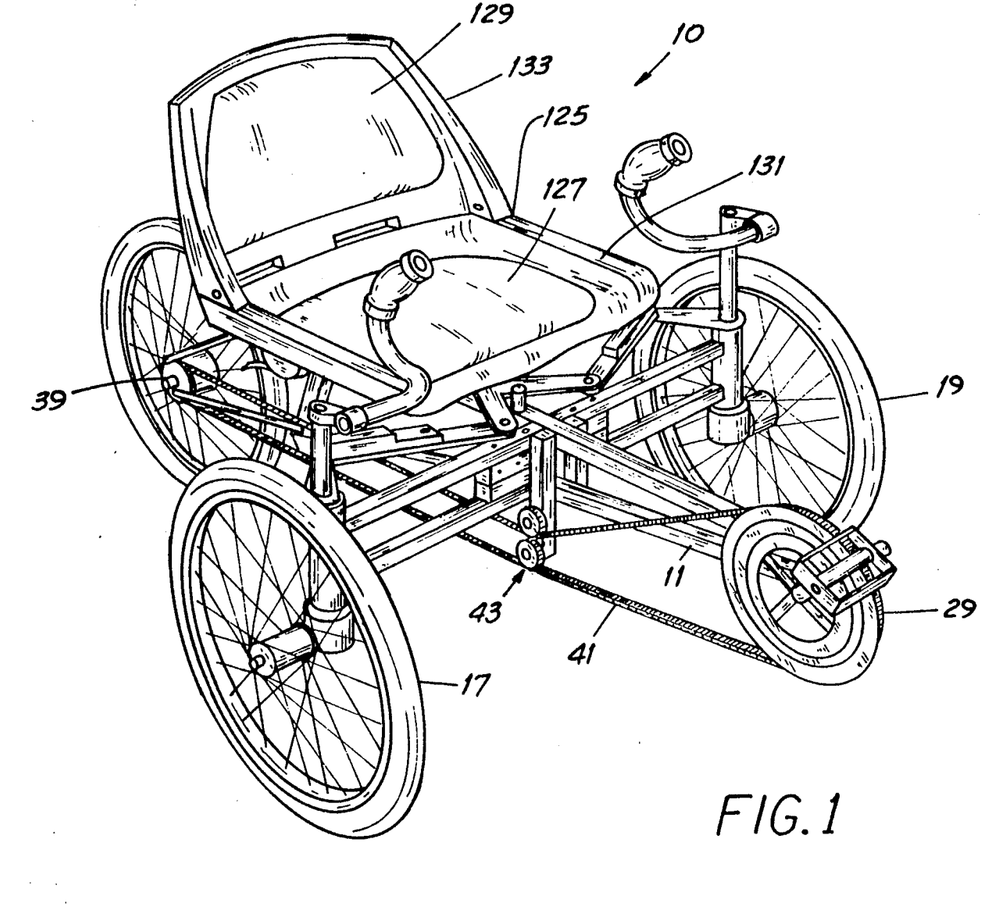
FIG. 1 is a perspective view of the inventive tricycle.
Figure 2:
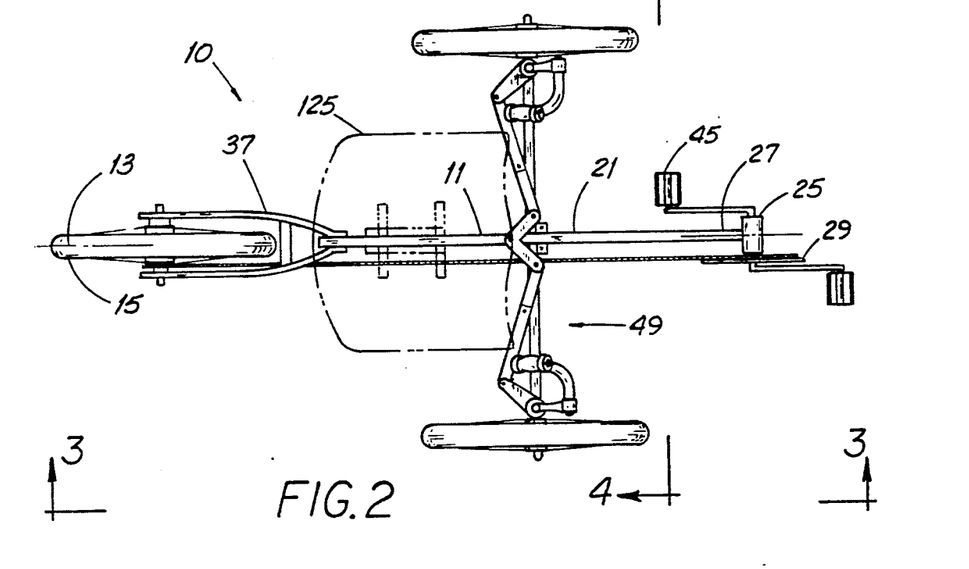
FIG. 2 is a top plan view of the tricycle of FIG. 1 with parts shown in dashed outline.
Figure 3:
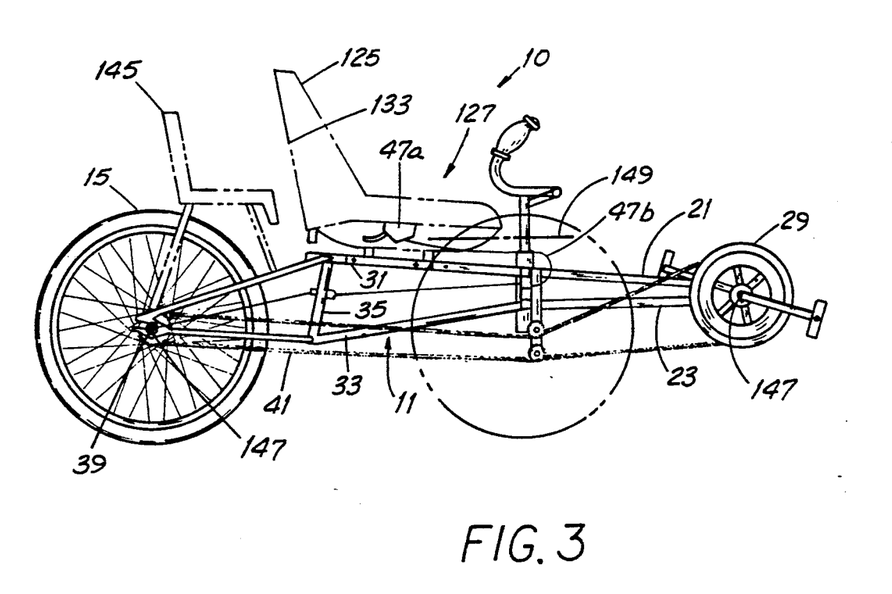
FIG. 3 is a side elevation view of the tricycle of FIG. 1 taken generally along the viewing plane 3—3 of FIG. 2, with parts shown in dashed outline, other parts omitted and yet other parts shown in phantom outline.

Referring first to FIGS. 1, 2 and 3 the improved tricycle 10 includes a rigid frame 11 made of tubing and extending along a central axis 13 coincident with the rear wheel 15 and generally midway between the front wheels 17, 19 when the tricycle 10 is set up for operation. Such tubing is square in cross-section although other tube shapes, e.g., round, can also be used. The frame 11 has a forward pair of members 21, 23 vertically spaced from one another and converging at a pedal hub 25 located at the forward frame end 27. Such hub 25 accommodates a conventional crank-type pedal arrangement with attached drive sprocket 29 of relatively large diameter.

The frame 11 also includes an aft pair of vertically spaced members 31, 33 divergently extending rearward and terminating in a support post 35 joining the ends of the members 31, 33. A conventional rear fork 37 is welded or otherwise attached to the post 35 and the rear drive wheel 15 is mounted on such fork 37.

The rear drive wheel 15 has a sprocket-driven shifting hub 39 with an integral pedal-operated brake mechanism. The drive chain 41 is guided by small idler gears 43 engaging such chain 41. Braking is by counter-rotation of the pedals 45 and shifting of the hub 39 is by a lever 47a and cable arrangement 47b mounted and operated as described below. Such construction eliminates a need for devices such as derailleurs and external wheel-clamp type brakes.

Figure 4:
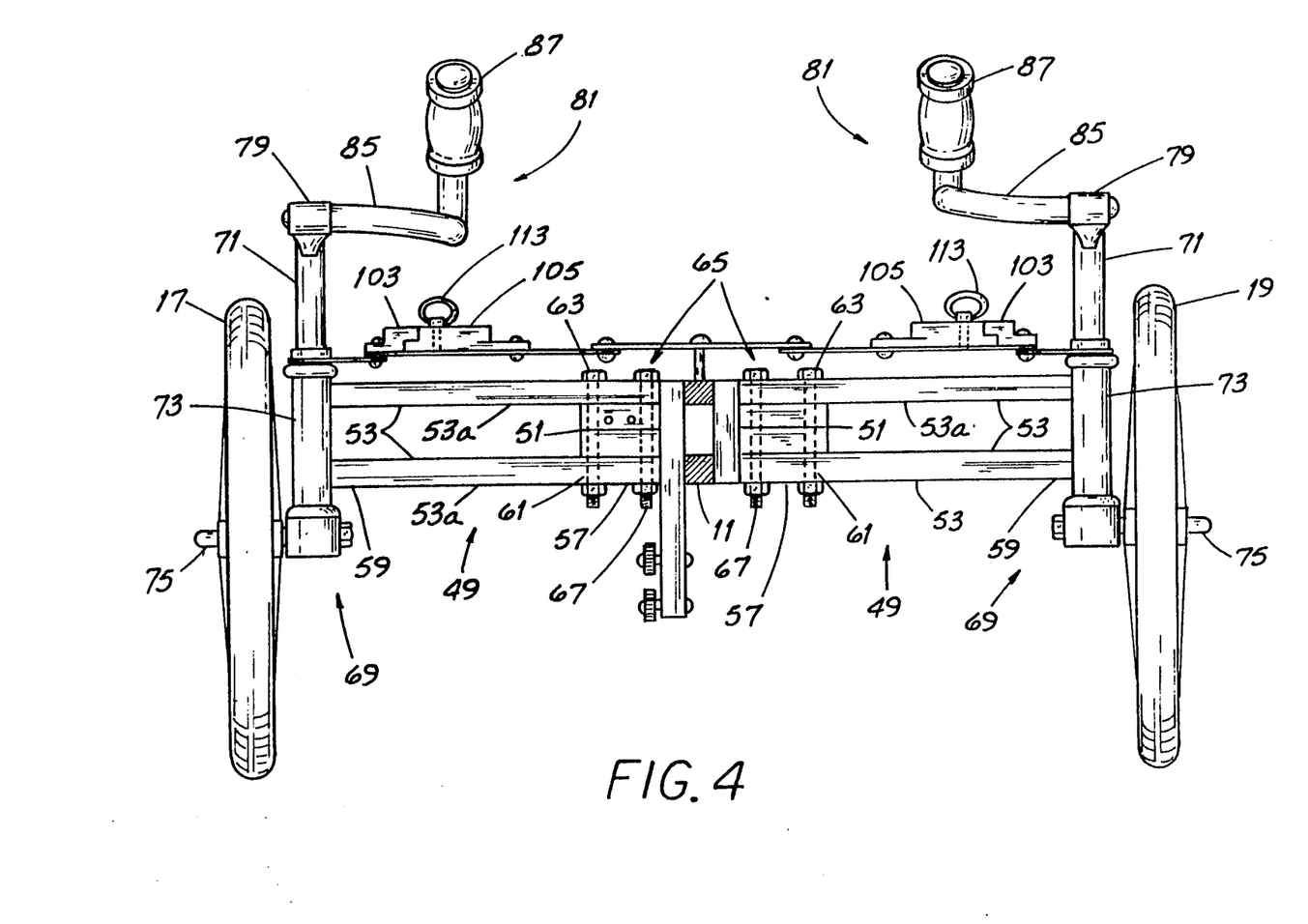
FIG. 4 is a front elevation view of the tricycle of FIG. 1 taken generally along the viewing plane 4—4 of FIG. 2 with parts shown in dotted outline and other parts omitted.
Figure 5:
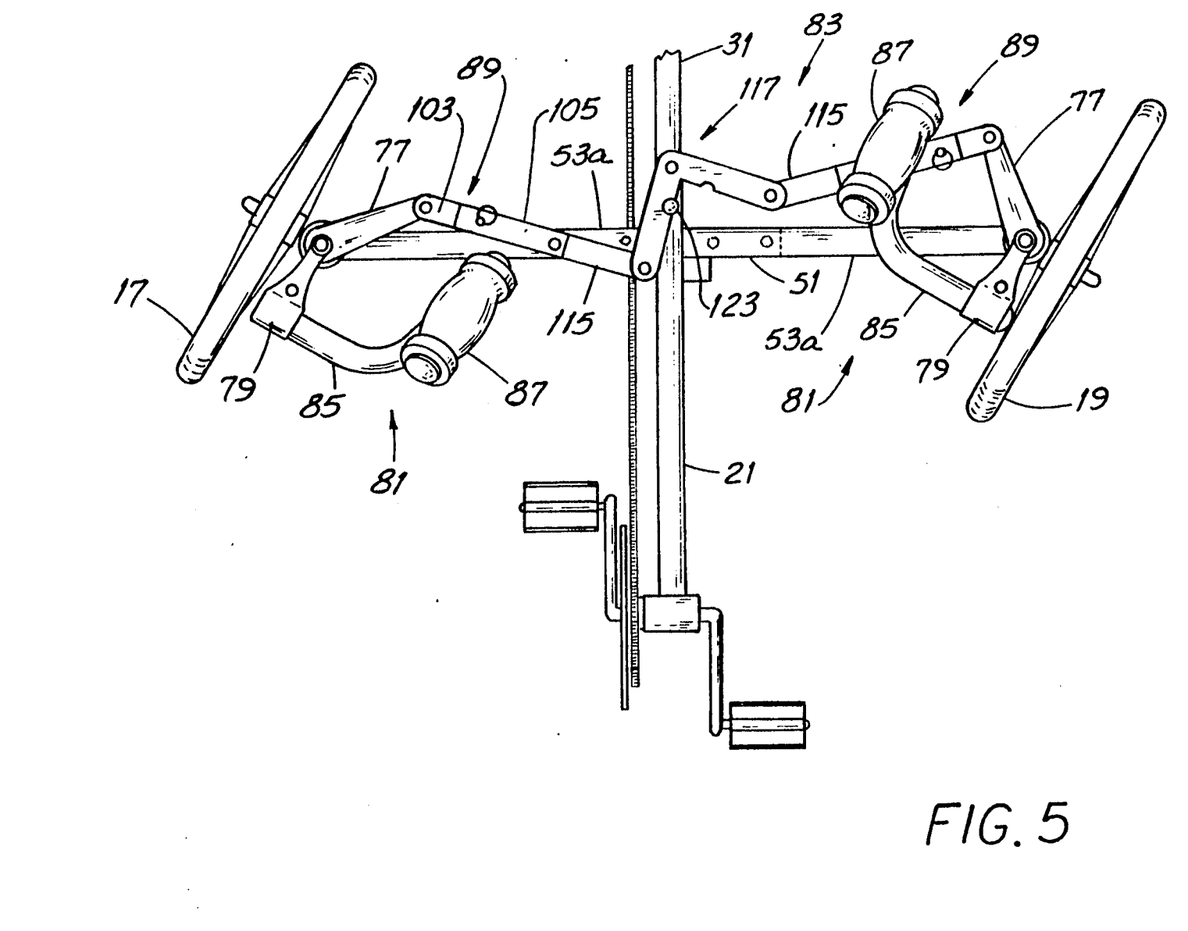
FIG. 5 is an enlarged top plan view of a portion of the tricycle shown in FIG. 1, with parts broken away, and showing the tricycle steered to the right.

Referring also to FIG. 4, the improved tricycle 10 has lateral support means 49 including a mounting boss 51 and a support arm 53 extending from each side of the frame 11. Each mounting boss 51 has a vertical height generally equal to the spacing between the bars 53a forming the support arm 53. And as best seen in FIG. 5, each boss 51 has a width generally equal to the thickness of such bars 53a, thereby providing a bar support surface.

Each support arm 53 has an inward or proximal portion 57 and an outward or distal portion 59, each such distal portion having a guide wheel 17 or 19 mounted thereon. A pivot joint 61 is located between the proximal and distal portions 57, 59 of each arm 53, such joint 61 including a bolt 63 extending through the upper and lower bars 53a of each support arm 53 as well as through the boss 51 located between the bars 53a. A locking device 65 is coupled to each proximal portion 57 for restraining the support arm 53 from pivoting movement when the tricycle 10 is in use. In one preferred embodiment, the locking device 65 includes a removable pin 67 extending through the boss 51 and through both bars 53a at the proximal portion 57 of each arm 53. When so mounted, the support arm 53 resembles a first class lever with its "fulcrum" or pivot axis between the proximal and distal portions 57, 59.

Figures 6, 8:
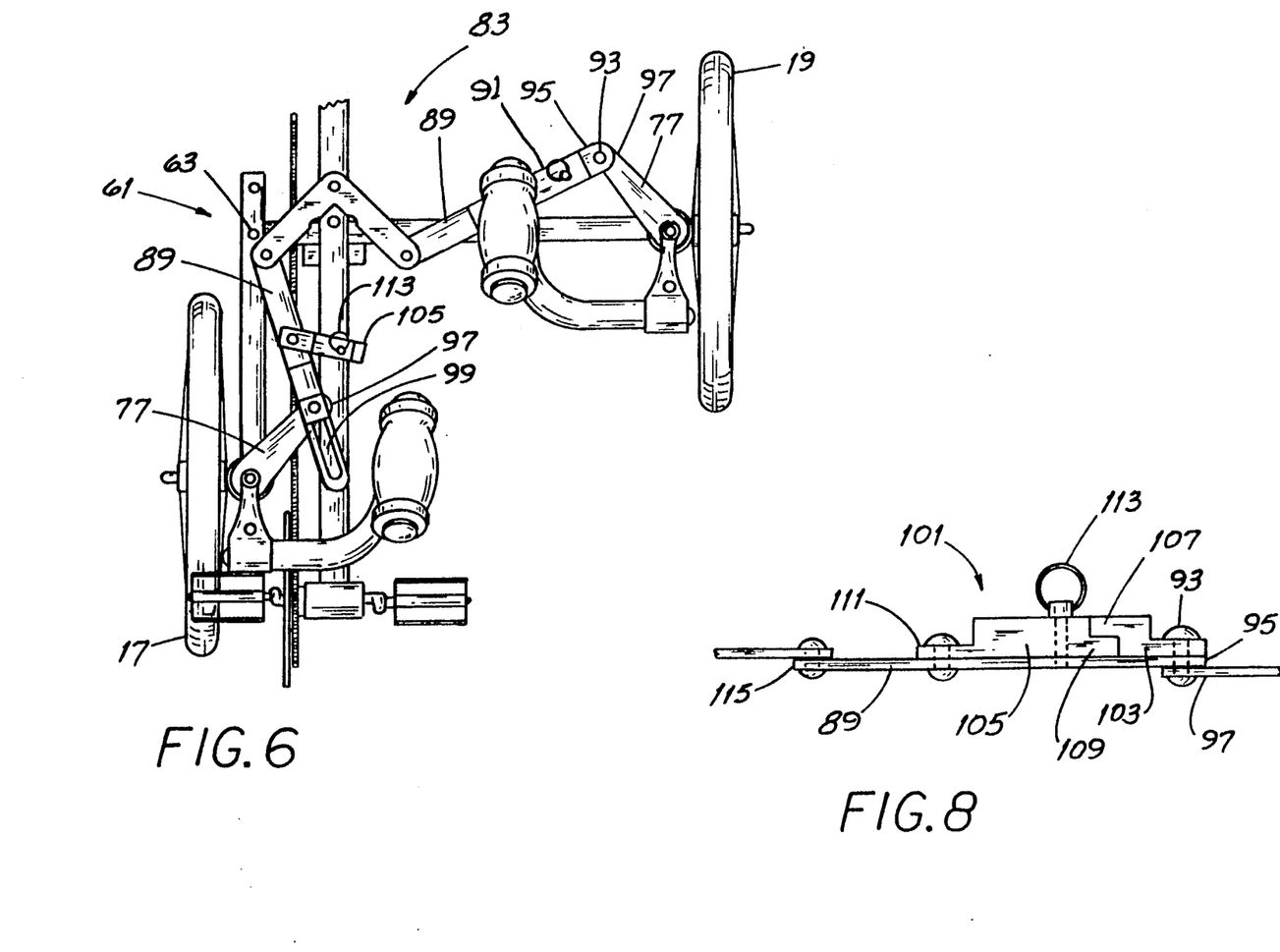
FIG. 6 is a view similar to that of FIG. 5 but with the tricycle in a partially collapsed arrangement.
FIG. 8 is a front elevation view of the tricycle blocking mechanism taken generally in the perspective of FIG. 4, with parts shown in dotted outline and others broken away.

As shown in FIG. 6, the pin 67 is removed to permit retraction of an arm 53 by folding it inward toward the frame 11. As described below, the wheels 17, 19 are nestled alongside the frame 11 and generally parallel thereto when the tricycle 10 is collapsed. This gives the tricycle 10 a wide stance for lateral stability. However, when it is collapsed, the frame 11 and lateral support means 49 are reduced to a width not much greater then the combined thickness of the two front wheels 17, 19 and the frame 11.

The tricycle 10 also includes re-orienting means 69 having a kingpin 71 mounted for turning movement in a cylindrical, generally vertical sleeve 73 attached to the distal portion 59 of each support arm 53. An axle 75 extends perpendicularly outward from the lower end of each kingpin 71 and has a guide wheel 17 or 19 rotatably mounted on it.

Figure 7:
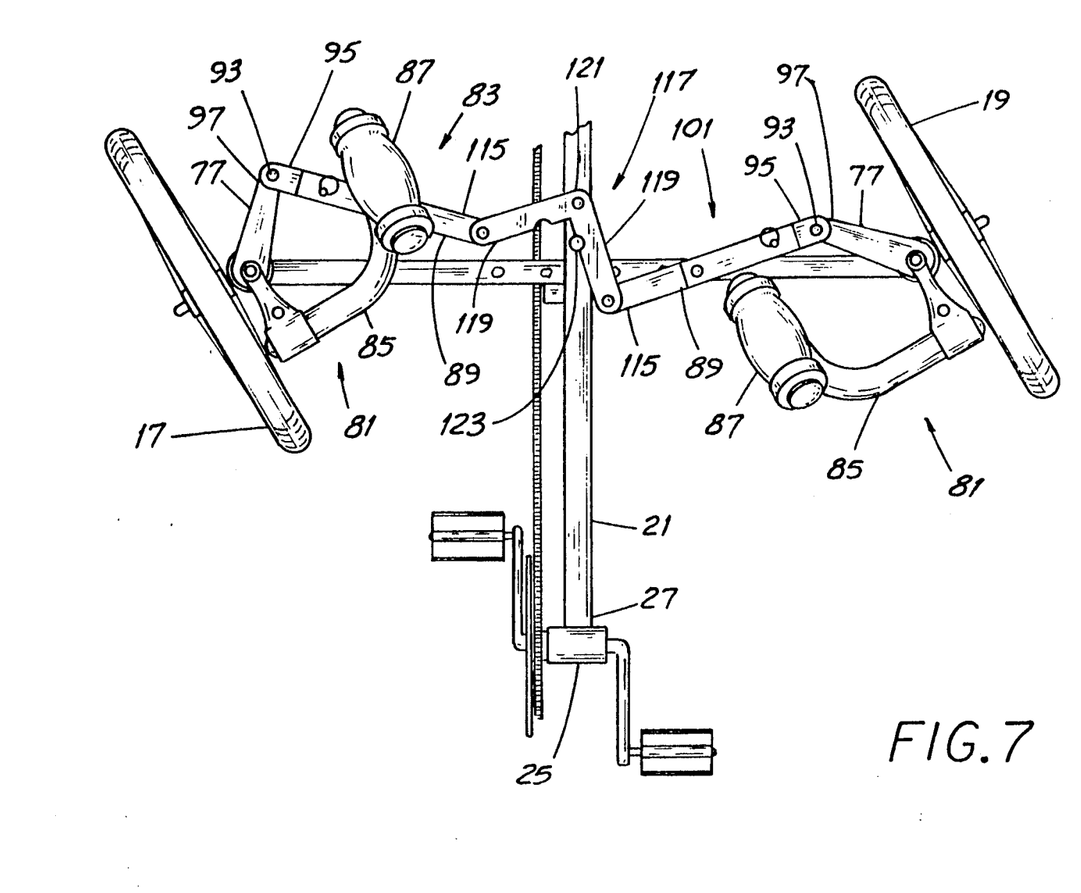
FIG. 7, similar to FIG. 5, is an enlarged top plan view of a portion of the tricycle shown in FIG. 1, with parts broken away, and showing the tricycle steered to the left.

As shown in FIGS. 5 and 6, a torsion member 77 is rigidly attached to each kingpin 71 at a location just above the sleeve 73 and turns coincident with the kingpin 71. Each kingpin 71 terminates in an upper stem 79 to which is connected an inwardly and upwardly extending tiller 81. Tricycle steering may be by a single tiller (not shown) arranged for simultaneously re-orienting or steering both wheels 17, 19. However, ease of collapsibility is greatly enhanced by using a separate tiller 81 for each wheel 17, 19. As will become more apparent from the details of the linkage means 83 set out below, separate tillers 81 exhibit contra movement during steering. As shown in FIGS. 5 and 7, one tiller 81 moves forward and the other rearward when making a turn and the forward-moving tiller (i.e., right or left) corresponds to the direction of the turn.

Each tiller 81 includes a curved tiller extension 85 connected to the upper stem 79 and an upstanding "pistol grip" type tiller handle 87 attached to each extension 85. To reduce the collapsed width of the tricycle 10, the extensions 85 are bent to be at slightly different elevations and one extension 85 (that which "underlaps" the other when the tricycle 10 is collapsed) is slightly longer than the other. In that way, the extensions 85 overlap when the tricycle 10 is collapsed but the handles 87 are maintained at generally equal elevations.

Referring particularly to FIGS. 5, 6 and 7, the linkage means 83 maintains the guide wheels 17, 19 parallel while steering. Such means 83 includes an arm 89 attached to the torsion member 77 by a coupling 91 Preferably, such coupling 91 is of the pin-and-slot type wherein a pivot pin 93 extends through the distal end 95 of the arm 89 and the distal end 97 of the torsion member 77. An elongate slot 99 is formed in the arm 89 and, unless blocked, the pin 93 is free to move inward and outward along the slot 99. As will become more apparent from the following, this feature contributes to the collapsibility of the tricycle 10.

Referring also to FIG. 8, the linkage means 83 also includes a blocking mechanism 101 having an outer fixed block 103 and an inner movable block 105. The outer block 103 has a upper tang 107 extending inward along the arm 89 to overlap and retain a lower tang 109 on the movable block 105. The block 105 is pinned for pivoting movement at its inner end 111 and has a spring-biased peg 113 mounted between the tang 109 and end 111. When the blocks 103, 105 are in overlapping engagement with one another and the peg 113 biased downward, the peg 113 engages the slot 99 and prevents the block 105 from moving sideways out of engagement with the block 103. As described in greater detail below, the peg 113 may be drawn upward to disengage it from the slot 99, thereby permitting the block 105 to be swung away from the block 103, thereby permitting the tricycle 10 to be collapsed. This capability is shown in FIG. 6.

When the blocking mechanism 101 is in the blocking position as shown in FIGS. 1, 2, 4, 5, 7 and 8, such mechanism 101 maintains a minimum distance between the coupling 91 and the proximal end 115 of arm 89. When the blocking mechanism 101 is positioned for collapsing the tricycle 10 as shown in the left protion of FIG. 6, the distance between the coupling 91 and the proximal end 115 may be changed, i.e., reduced.

Referring next to FIGS. 5 and 7, the proximal end 115 of each arm 89 is attached to a synchronizing yoke 117 to maintain the guide wheels 17, 19 parallel as the tricycle 10 is steered. In a highly preferred embodiment, the yoke 117 is generally V-shaped and has a pair of diverging extensions 119. The yoke 117 is pivotably pinned to the frame 11 at its apex 121 and the outer end of each extension 119 is pivotably connected to the proximal end 115 of an arm 89. FIGS. 5 and 7 show the positions of the torsion members 77, arms 89 and yoke 117 when the tricycle 10 is being steered right and left, respectively.

To prevent oversteering, a stop 123 is attached to the frame 11 in a position such that an extension 119 contacts the stop 123 at each limit of steering angle. When viewed from a seated rider's vantage point, the right extension 119 contacts the stop 123 to limit the angle of left turns and vice versa. It is apparent from the foregoing that other arrangements of yokes 117 and stops 123 may be provided without departing from the invention.

Referring now to FIGS. 1, 2, 3, 9 and 10, one of the advantages of the improved tricycle 10 is its chair-like seat 125. Such seat 125 is padded on its seating surface 127 and back surface 129 for extra comfort. Both the bottom panel 131 and back panel 133 of the seat 125 are contoured in what may be described as a "wrap around" configuration somewhat resembling that of a bucket seat in an automobile. Such configuration not only lends rigidity to the seat 125 but also helps restrain the rider during turns, especially sharp turns. The back surface 129 is angled only slightly toward the rear drive wheel 15. In that way, the rider's posture is maintained much like that of an individual seated in a conventional chair.

Figure 9:
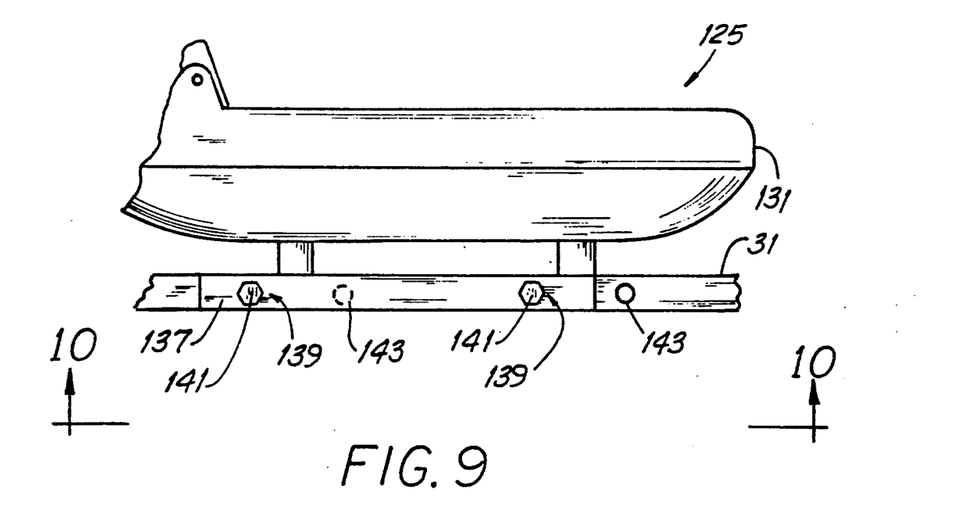
FIG. 9 is a side elevation view of the seat and its mounting bracket taken from the prospective of FIG. 3 and with parts broken away.
Figure 10:
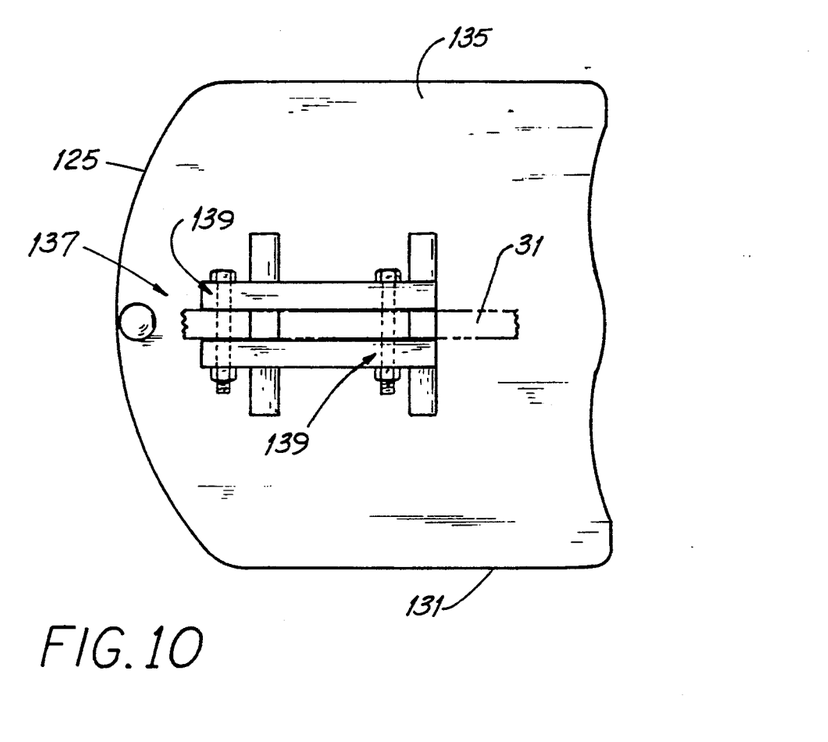
FIG. 10 is a bottom plan view of the seat of FIG. 9 taken generally along the viewing plane 10—10 thereof.

Referring to FIG. 3, 9 and 10, the underside 135 of the bottom panel 131 is fitted with an inverted U-shaped bracket 137 sized to fit over the bar 31 with slight clearance. Such bracket 137 has spaced holes 139 formed in it for receiving mounting pins 141. The upper bar 31 similarly includes adjacent sets of holes 143 spaced from one another by a dimension equal to that between the sets of holes 141 in the bracket 137. The mounting pins 141 secure the bracket 137 and seat 125 to the bar 31 in a way that the seat 125 may be repositioned fore and aft by removing the pins 141, sliding the bracket 137 and seat 125 to a different location and re-inserting the pins 141. In that way, the seat 125 is adjustable to accommodate riders having differing body dimensions. And of course, the seat 125 is removable from the frame 11 so that when the tricycle 10 is collapsed for transporting, such tricycle 10 fits into a smaller space.

An infant seat 145 is supported above the wheel 15 by brackets. Such seat 145 is preferably forward-facing and elevated sufficiently such that a small occupant can see forward.

Referring particularly to FIG. 3, the seating surface 127 is above an imaginary line extending between the axes of rotation 147 of the pedal sprocket 29 and the drive wheel 15. In that way, the rider sits relatively high on the tricycle 10, well above the ground, and has excellent visibility in traffic. And that is not all.

The pedal sprocket 29 is positioned generally below a plane 149 extending horizontally from the seating surface 127. The relative locations of the sprocket 29, seating surface 127 and slightly angled back panel 133 surface support the rider in a quasi-recumbent position so that the rider's legs and knees do not impair visibility. Notwithstanding, the rider is able to nevertheless obtain the power advantages of a full recumbent tricycle in that such rider can push against the back panel 133 while pedaling.

One of the problems confronting designers of folding cycles generally is the disconnection and connection of cables when a tricycle is collapsed and set up, respectively. Typically, cables are required for operating derailleurs and external brakes. One need only analyze conventional bicycles and tricycles to appreciate the nature of the problem. And the problem is aggravated in a tricycle to such an extent that insofar as is known, no practical collapsible tricycle has been developed until the inventive tricycle 10.

The improved tricycle 10 resolves such difficulties in the following ways. Referring to FIG. 3, multi-speed shifting of the hub 39 is by a lever 47a mounted on the seat 125 and linked to the shifting hub 39 by a flexible steel cable arrangement 47b extending rearward near the frame 11. A five speed capability is provided in the preferred embodiment. If it becomes necessary to remove the seat 125 from the frame 11 for transporting, the lever 47a may nevertheless remain attached to the seat 125 or, in the alternative, may be detachable therefrom.

While the principles of this invention have been described in connection with specific embodiments, it should be understood clearly that these descriptions are made only by way of example and are not intended to limit the scope of the invention.

I claim:

1. In a tricycle having a rear drive wheel and a pair of forward guide wheels, the improvement including:
   a rigid frame extending along a central axis with the rear drive wheel mounted thereon;
   lateral support means extending from either side of the frame and having distal portions with the guide wheels pivotably mounted thereon for tricycle steering;
   separate steering means at each distal portion for reorienting the guide wheel relative to its distal portion;
   linkage means between the pair of reorienting means to maintain the guide wheels parallel irrespective of orientation; and,
   means to retract the lateral support means with respect to the frame and thereby collapsing the tricycle without removing the rear drive wheel.

2. The tricycle of claim 1 wherein the retracting means includes a pair of pivot joints permitting movement of the support means with respect to the frame whereby such guide wheels may be drawn inward toward the frame.

3. The tricycle of claim 2 wherein the retracting means further includes a locking device for restraining the support means from pivoting movement when the tricycle is in use.

4. The tricycle of claim 3 wherein the lateral support means includes a support arm extending from each side of the frame and having a proximal portion and wherein a pivot joint is between the distal and proximal portions of each arm.

5. The tricycle of claim 4 wherein a locking device is coupled to each proximal portion for restraining movement.

6. The tricycle of claim 1 wherein the linkage means includes an arm having a proximal end attached to the reorienting means by a coupling and wherein the distance between the coupling and the proximal end, as measured along the arm, is changed when collapsing the tricycle.

7. The tricycle of claim 6 wherein the linkage means further includes a blocking mechanism for maintaining a minimum distance between the coupling and the proximal end when the tricycle is in use.

8. The tricycle of claim 7 wherein the linkage means includes two arms, each having its proximal end attached to a one-piece V-shaped synchronizing yoke whereby the guide wheels are maintained parallel when the tricycle is in use.

9. The tricycle of claim 8 further including a steering stop and wherein the yoke contacts the stop for limiting the steering angle of the guide wheels.

10. The tricycle of claim 9 wherein the yoke includes two extensions, wherein the steering stop is attached to the frame and wherein an extension contacts the stop at each limit of steering angle.

11. The tricycle of claim 7 wherein the coupling is of the pin-and-slot type permitting pivoting motion about the pin and movement of the pin along the slot.

12. The tricycle of claim 1 wherein the reorienting means includes a tiller for tricycle steering.

13. The tricycle of claim 12 wherein the reorienting means includes a pair of tillers, one such tiller mounted for steering each guide wheel.

14. The tricycle of claim 13 wherein the tillers exhibit pivoting contra-movement as the tricycle is steered.

15. The tricycle of claim 14 wherein the tillers include handles attached to handle extensions formed to overlap when the tricycle is collapsed while yet maintaining the handles at substantially the same height.

16. The tricycle of claim 1 further including an infant seat thereon.

17. The tricycle of claim 1 further including:
a chair-like seat having a seating surface and a generally upright, folding back panel, the seat being adjustable fore and aft and being removable from the frame.

18. The tricycle of claim 1 wherein the rear drive wheel is of the shifting hub type having an integral pedal-operated brake mechanism and wherein the tricycle is thereby devoid of a derailleur and external brakes so that the tricycle is more easily collapsed.

19. The tricycle of claim 18 further including a chair-like seat and wherein the shifting hub is actuated by a lever mounted on the seat.

* * * * *